United States Patent Office 2,712,197
Patented July 5, 1955

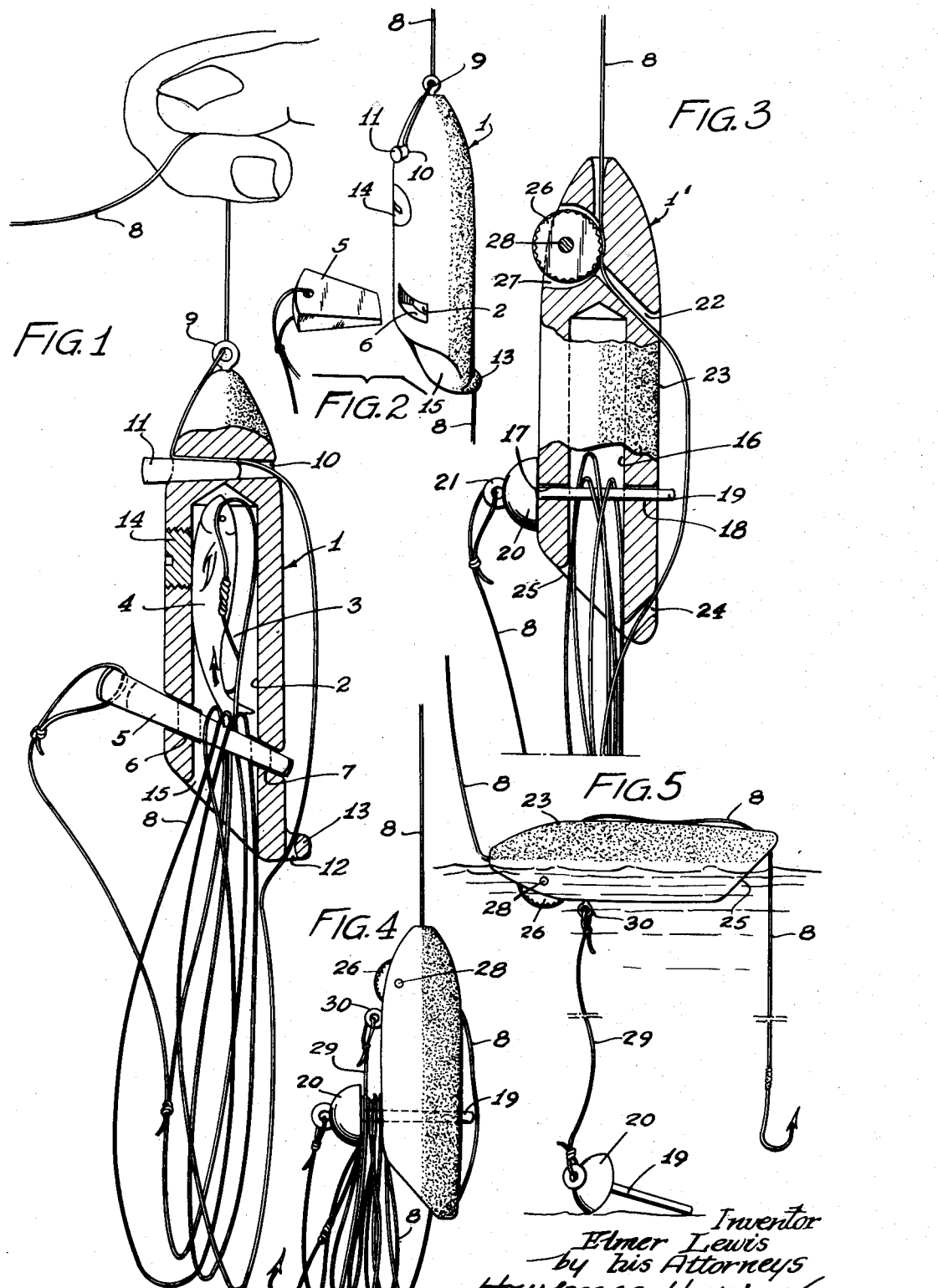

2,712,197
CASTING FLOAT
Elmer Lewis, Eustis, Fla.

Application September 30, 1948, Serial No. 51,880

8 Claims. (Cl. 43—43.11)

This invention relates to improvements in fishing tackle and more particularly to tackle of the type including a float for maintaining the bait at or above a predetermined depth.

A principal object of the invention is to provide improved means whereby, in tackle of this class, the line may be more readily and efficiently cast.

A more specific object of the invention is to provide an improved form of float designed to constitute a temporary carrier for the bait and/or the sinker conventionally used in tackle of this character to carry the baited hook to the depth of immersion permitted by the float.

Still more specifically an object of the invention is to provide a float and sinker combination wherein provision is made for mounting the sinker on the float for automatic release either before or after the float has struck the water in the cast, and in this respect the invention resides in certain novel structural details affording a degree of flexibility in regulation of the point at which the sinker will leave the float.

Still another object of the invention is to provide means whereby a pull on the hook will cause the float to rotate in the water about its longitudinal axis as a medium for determining the size and nature of the fish attracted by the bait.

The invention further contemplates a device of the character described above wherein means is provided for holding the portion of the line extending between the hook and the float in compact looped form on the latter, so as to reduce to a minimum the air friction tending to retard the flight of the float when cast.

The invention resides also in certain structural details hereinafter described and illustrated in the attached drawings, wherein:

Fig. 1 is a side and partial sectional view of a fishing tackle made in accordance with the invention, illustrating the manner in which the sinker, terminal end of the line, hook, and bait are supported on the float in preparation for casting;

Fig. 2 is a reduced side view of the form of the invention illustrated in Fig. 1 showing a detail thereof;

Fig. 3 is a side and partial sectional view of a modified form or embodiment of the invention, illustrating the manner in which the sinker and terminal end of the line are supported on the float in preparation for casting;

Fig. 4 is a view similar to Fig. 2 but illustrating another embodiment of the invention; and Fig. 5 is a view of the embodiment of Fig. 4 showing the float in the position normally assumed in the water.

With reference to Figs. 1 and 2 of the drawings, the tackle therein illustrated comprises a float 1, of wood or other suitable material, having substantially conventional form. Float 1 is recessed longitudinally from one end thereof to provide a longitudinal pocket extending inwardly from said one end of the float, this pocket being designated by the reference numeral 2 and being of sufficient size to receive the baited hook 3, the bait being indicated by reference numeral 4. The sinker is in the form of a wedge 5 which, as shown in Fig. 2, not only tapers from face to face, but from side to side. This wedge-shaped sinker is adapted for insertion in an aperture 6 toward the forward end and at the underside of the float, said aperture 6 extending through the opposite wall of the pocket 2 to the top of the float as indicated by the reference numeral 7. When the sinker 5 is inserted in the apertures 6—7, it thereby forms a partition partially blocking the outer end of the recess 2 and retaining the baited hook 3 in place at the inner end of the pocket 2. By reason of the laterally tapered form of the sinker 5, the portion thereof occupying the pocket 2 is not as wide as the width of the pocket and extends completely across the diametrical dimension of the latter, so that the sinker is available as a support for the looped line 8. Also, by reason of the tapered form of the sinker, the outer end, i. e., that end to which the line 8 is attached and which projects from the underside of the float, will constitute the major mass of the sinker so that the sinker will free itself readily from the apertures 6—7.

In the form of the invention illustrated in Figs. 1 and 2, the float is provided at the end thereof opposite the recess 2 with an eyelet 9 and with a passage 10 which extends through the float from top to bottom, this passage being slightly tapered from the bottom end to the top end. The line 8 passes through the eyelet 9 and through the passage 10 from the bottom to the top of the float, and the latter is fastened to the line by means of a tapered plug 11 which fits the tapered passage 10. At the end of the float opposite the eyelet 9, the line 8 passes through an aperture 12 in a boss 13 which extends outwardly from the upper surface of the float. The float 1 is provided with a metallic insert 14 which functions as a weight to maintain the float in its normal, substantially horizontal position in the water. The end of the float from which the recess 2 extends is beveled on the underside as indicated at 15.

The passage 10 lies at the end of the float from which, in assembly, the line 8 passes to the rod, and for purposes of description, this end of the float will be designated "rear" end as distinguished from the opposite or forward end which contains the apertured boss 13 and from which the hooked end of the line 8 extends.

By reason of the construction above described, the float 1 and sinker 5 are in effect united, so that they can be projected through the air as a unit, thereby very materially increasing the efficiency of the cast and permitting the hooked end of the line to be projected to relatively great distances from the point of cast. The looping of the line 8 over the sinker 5 and the temporary disposition of the bait 4 within recess 2 answers a useful end, in that it materially reduces the effective length of line exposed to the friction of the air thereby further increasing the potential length of the cast.

When the float 1 strikes the surface of the water, it will immediately assume a substantially horizontal position, such as the position in which it is shown in Fig. 5, this by reason of a relatively low center of mass in the float itself resulting from the presence at the under side of the metallic insert or weight 14 and by reason further of the presence of sinker 5. In this normal substantially horizontal position of the float, the sinker and the looped line including the bait 4, are free to leave the float 1 by gravity so that the sinker will carry the hook downwardly into the water.

It is to be noted that the sinker 5, being at the forward end of the float, the latter, when cast, will tend to move through the air smoothly with the forward end in advance, the weight of the sinker tending to pull the float and to withdraw the line from the reel. It is to be noted also that by reason of the unbalanced weight of the sinker, the float will tend by gravity to assume, while still in the air, the position which it normally assumes in the water, that is to say, with the sinker 5 extending downwardly. As the float passes the top of its trajectory and the rate of speed of the float and sinker assembly tends to diminish, there will be an increasing tendency for the sinker to leave the float by gravity. If the sinker 5 is inserted relatively loosely into apertures 6 and 7, this tendency may cause the sinker to leave the float before the float strikes the water, and the sinker having once left the float will tend to move ahead of the float in the direction of the cast, thereby extending the line and giving a greater effective distance to the cast.

One desirable characteristic of a float constructed as described above resides in the effect upon the float in the water when the hooked end of the line is subjected to a pull such as might result from a fish attacking the bait. The float, when in the water, assumes a normal substantially horizontal position and if moved from this position will tend to return to it. Since the apertured boss 13 from which the hooked end of the line extends, occupies a relatively elevated position at the top of the beveled surface 15 and well above the surface of the water on which the float rests, it will be apparent that any pull upon the hooked end of the line will have a tendency to cause the float to turn about its longitudinal axis. By giving the upper and under sides of the float contrasting colors, this tilting tendency of the float will afford a readily visible and highly sensitive indication. The extent to which the float turns in the water about its longitudinal axis, i. e., the angular dispacement of the float, is a function of the strength of the pull causing said displacement so that the movement affords a reliable indication of the size and character of the fish attacking the bait.

The embodiment of Fig. 3 also corresponds generally to the embodiment of the invention described above. The float 1¹ is recessed longitudinally from the forward end thereof, as indicated at 16, and toward the forward end, the walls defining the recess are apertured as indicated at 17, 18, these apertures being in diametrical alignment and being adapted for reception of a pin 19. This pin has a weighted head 20 and constitutes the sinker, means being provided in the form of an eyelet 21 at the top of the head for attachment thereto of the line 8. The stem of the pin 19, when inserted in the apertures 17 and 18, intersects the recess 16 and provides a medium for retaining that portion of the line 8 which extends from the forward end of the float 1¹ to the hook. It is evident that the line need not necessarily be looped over the pin 19, but could be merely forced into the pocket 16 for retention therein during the cast by the obstruction afforded by the inserted pin 24. As clearly illustrated in Fig. 3, the float has a passage 22 which enters the float at one terminal end and extends to what may be termed the upper surface 23 of the float at a point adjacent the same end. A second passage 24 is provided at the opposite end of the float extending from the top 23 of the latter to the proximate extremity, this end of the float being beveled on the under side, as indicated at 25. The line 8 to which the float is attached, passes through the passages 22 and 24, and the float is anchored to the line in the desired position longitudinally of the latter through the medium of a locking cam 26, preferably of rubber or like pliable material, which is pivotally mounted in a recess 27 formed in the bottom of the float and intersecting the passage 22. The cam 26 is eccentric with respect to the supporting pin 28 so that it can be turned into the position shown in Fig. 3, wherein the knurled periphery of the cam clamps the line 8 against the wall of the passage 22, or to an alternative position wherein the peripheral surface of the cam is remote from the said wall so that the line is released.

In operation, this embodiment functions similarly to that described above, it being apparent that when the float strikes the water and assumes a normal gravity-imposed position, the sinker 20 will pass by gravity from the apertures 17 and 18 and will draw the hooked end of the line downwardly to the desired depth. Obviously the exact depth of the hook may be determined by adjustment of the float on the line, which adjustment is facilitated by the cam lock device described above and indicated in Fig. 3 by the reference numeral 26.

The embodiment shown in Figs. 4 and 5 corresponds closely to that illustrated in Fig. 3, with the exception that in this instance the sinker is divorced from the line 8 which carries the hook. The sinker in this case takes the form of the sinker 19—20 shown in Fig. 3, and is accordingly designated by the same reference numerals. It is attached by a length of line 29 to an eyelet 30 at the under side of the float, as best illustrated in Fig. 5. The sinker 19—20 is attached to the float for casting in the same manner as that illustrated in Fig. 3 and functions to support the hooked end of the line 8 by looping the latter over the pin 19 between the surface of the float and the head 20, as shown in Fig. 4.

It will be understood that the embodiments of the invention herein disclosed are subject to further modification in detail without departure from the invention, and that the principle of the invention may find other embodiments within the limits imposed by the appended claims.

I claim:

1. In fishing tackle of the class described, a casting float, means for attaching the float to a line with the captive end of the line extending to one end of the float and the outer or hook end of the line extending from the other end of the float and a sinker attached to the said hook end of the line, said float having a transverse socket in the side thereof for reception of said sinker and said socket constituting means independent of the line and releasable by gravity, acting solely in direction transverse to an axial line intersecting the said ends of the float, for detachably holding the sinker on the hook end of the float to provide for casting of the float and sinker as a unit, and said sinker being elongated for insertion loosely in the socket.

2. Fishing tackle according to claim 1 wherein the float is recessed from the end thereof from which the hook end of the line extends, the sinker receiving socket intersecting said recess.

3. Fishing tackle according to claim 2 wherein the sinker receiving socket intersects the outer end of the said recess, the sinker when inserted serving to partially block said outer end.

4. In fishing tackle of the class described, a casting float, means at one end for attachment thereto of a fishing line and a sinker attached to the line, said float having a transverse socket in the side and at the opposite end thereof for reception of the sinker and said socket constituting means independent of the line for detachably holding the sinker on the said opposite end of the float for release by gravity acting solely in a direction transverse to an axial line intersecting the said ends, and said holding means thereby providing for casting of the float and sinker as a unit.

5. Fishing tackle according to claim 4 wherein the float has a recess extending inwardly from the said opposite end, the sinker receiving socket intersecting said recess.

6. In fishing tackle of the class described, a float, a line attached to the float and a sinker attached to the line, said float having a socket for reception of the sinker and said sinker when inserted in the socket having a part over which the portion of said line between the sinker and the float may be looped for retention of the line in bunched condition while casting.

7. Fishing tackle according to claim 6 wherein the sinker when fully inserted in the socket has an outer end portion projecting beyond the outer surface of the float for reception of the looped line.

8. Fishing tackle according to claim 7 wherein the sinker has means on the said outer end portion for attachment of an end portion of the looped line.

References Cited in the file of this patent

UNITED STATES PATENTS

| | | |
|---|---|---|
| 565,030 | Quinan | Aug. 4, 1896 |
| 1,885,311 | Whitcomb | Nov. 1, 1932 |
| 1,915,208 | Walthers | June 20, 1933 |
| 1,918,507 | Westling | July 18, 1933 |
| 1,993,974 | McVicker | Mar. 12, 1935 |
| 2,019,630 | Peeso | Nov. 5, 1935 |
| 2,212,941 | Johnson | Aug. 27, 1940 |
| 2,251,721 | Shepherd | Aug. 5, 1941 |
| 2,413,371 | Parker | Dec. 31, 1946 |
| 2,444,597 | Erickson | July 6, 1948 |
| 2,475,736 | Burrous | July 12, 1949 |
| 2,488,475 | Merritt | Nov. 15, 1949 |
| 2,575,852 | Trowbridge | Nov. 20, 1951 |